United States Patent

Gerresheim et al.

[11] Patent Number: 5,927,348
[45] Date of Patent: Jul. 27, 1999

[54] METHOD OF REMOVING PUNCTURE SEALING MEANS FROM TIRES AND APPARATUS FOR CARRYING OUT THE METHOD

[75] Inventors: Manfred Gerresheim, Obertshausen-Hausen; Hans-Bernd Fuchs, Alzenau-Horstein; Ulrich Steinbrecht, Ober-Ramstadt; Hans Hubert, Freigericht, all of Germany

[73] Assignee: SP Reifenwerke GmbH, Hanau, Germany

[21] Appl. No.: 08/882,115

[22] Filed: Jun. 25, 1997

[30] Foreign Application Priority Data

Jun. 25, 1996 [DE] Germany .................. 196 25 372

[51] Int. Cl.⁶ ............................................. B65B 31/04
[52] U.S. Cl. .................... 141/65; 141/38; 141/39; 141/64; 141/66
[58] Field of Search ................. 141/38, 39, 64, 141/65, 66

[56] References Cited

U.S. PATENT DOCUMENTS

| 2,222,047 | 11/1940 | Snyder | 141/38 |
| 2,488,946 | 11/1949 | Turpin | 141/38 |
| 2,929,432 | 3/1960 | Kominic et al. | 141/38 |
| 3,062,590 | 11/1962 | Turner et al. | 141/66 |
| 3,065,774 | 11/1962 | Grimes | 141/38 |
| 3,729,033 | 4/1973 | Bayerkohler | 141/231 |
| 5,639,319 | 6/1997 | Daly | 141/38 |

Primary Examiner—David J. Walczak
Assistant Examiner—Timothy L. Maust
Attorney, Agent, or Firm—Birch, Stewart, Kolasch & Birch, LLP

[57] ABSTRACT

A method and apparatus for removing puncture sealing compositions from a tire, characterized by allowing air pressure to flow out of the tire via the valve, removing the tire valve, introducing a hose into the tire through the valve bore until the introduced hose end dips deeply into the sealing preparation contained in the tire and generating a pressure differential so that the sealing preparation is removed through the hose.

16 Claims, 3 Drawing Sheets

METHOD OF REMOVING PUNCTURE SEALING MEANS FROM TIRES AND APPARATUS FOR CARRYING OUT THE METHOD

BACKGROUND OF THE INVENTION

1. Field of the Invention

The present invention relates to a method of removing puncture sealing preparations from tires and also to apparatus for carrying out the method.

2. Description of Related Art

Sealing preparations are increasingly being used for tires with punctures. They mainly contain colloidal dispersions of polymers in aqueous media. Thus, by way of example, polystyrene butadiene latexes, polyvinylacetate latexes and rubber latexes are used. Such a sealing preparation is described in the German patent application 195 45 935.0, which contains natural rubber latex and an adhesive resin.

Following a tire puncture, the sealing preparation is sprayed into the tire via the tire valve and the tire is pumped up to a specific pressure by means of a propellant gas or compressor. The tire is then run for a few kilometers, depending on the nature of the defect, to distribute the sealing preparation within the interior of the tire and to seal the defect. Thereafter the tire may be fully inflated to its desired pressure.

The so-sealed tire must be later removed from the rim in a car repair workshop or at a tire fitters. A considerable proportion of the sprayed-in sealing preparation is present in a liquid form within the interior of the tire and can run out from the rim during the removal of the tire. The sealing preparation is sticky, unpleasant and also smells of ammonia. In addition, the sealing preparations contains natural rubber latex.

Contamination of the workshop with the sealing preparation thus should be avoided as far as possible. Accordingly, it is desirable to remove the sealing preparation from the tire prior to removal of the tire from the rim.

BRIEF SUMMARY OF THE INVENTION

The object of the present invention is to make available methods for removing puncture sealing preparations from tires and also apparatus for carrying out the method.

According to a first aspect of the invention, there is provided a method of removing puncture sealing compositions from a tire characterized by allowing air pressure to flow out of the tire via the valve, removing the tire valve, introducing a hose into the tire through the valve bore until the introduced hose end dips deeply into the sealing preparation contained in the tire, and generating a pressure differential so that the sealing preparation is removed through the hose.

In one method, the pressure differential may be generated by generating depressed pressure in a container which is connected to the other hose end by which the sealing preparation is sucked out of the tire into the container.

This procedure can be repeated several times. One expediently arranges the container to be beneath the sealing preparation which has to be sucked out of the tire.

In this embodiment a compressible container, for example a bottle of soft plastic is used, having an opening to which a hose can be attached in an air-tight manner. In this case the same container can be used as that from which the sealing preparation was sprayed into the tire following a puncture, via a hose pushed onto the tire valve, by compression of the container.

It is also possible to use a container with a second opening, to which a lowered pressure or suction is applied.

In another embodiment of the method of the invention, following the introduction of a hose into the sealing preparation in the tire, the intermediate space between the hose and the valve bore is sealed off and an excess pressure is generated in the tire by which the sealing preparation is propelled out of the tire, via the hose, into the container which is connected to the hose.

For the generation of overpressure in the tire, the hose end is connected to a pressure source outside of the tire. An overpressure of 0.5 to 1 bar is preferably generated in the tire with compressed air. After the generation of the overpressure, the connection to the pressure source is interrupted and the hose is connected to the container into which the sealing preparation is pressed out of the tire by the overpressure.

The sealing off of the intermediate space between the hose and the valve bore can be achieved by using a rubber cone pushed onto the hose.

As an apparatus, one can use a container provided with a vent opening, which is connected to a line which leads to one opening of a T-shaped connector and is provided with a blocking member. When using a hose as the line, a hose clamp can be used. A pressure source is connected to the second opening of the T-shaped connector, with a non-return valve being provided between the connection piece and the pressure source. The hose, whose other end dips into the sealing preparation in the tire, is connected to the third opening to the T-shaped connector. Compressed air from the pressure source, for example a compressor or a filling system present at filling stations, is first filled into the tire via the T-shaped connector and the hose, with the blocking member in the line to the container being closed. Once the desired overpressure in the tire is achieved, the blocking member in the line to the container is opened so that the sealing preparation is pushed out of the tire through the hose into the container.

In place of the T-shaped connector one may use a three-way cock. In this case, one does not need any blocking member. For safety reasons, a pressure relief valve is preferably provided in the line between the pressure source and the three-way cock. This line and also the connection between the three-way cock and the container can take the form of hoses.

In this embodiment, a connection between the pressure source and the hose introduced into the tire is first produced by the three-way cock, whereas the line to the container is closed off. Once the desired overpressure has been achieved, the three-way cock is moved into a position in which the connection to the pressure source is closed off, while the hose introduced into the tire is connected to the line to the container. The sealing preparation is pressed into the container through the overpressure in the tire.

In the previously described embodiments, an overpressure is thus first generated in the tire and the sealing preparation is subsequently pressed out of the tire by the overpressure. Compressed air and sealing preparation are respectively supplied and led away through the same hose. In the following embodiment, the sealing preparation is pressed out of the tire while the compressed air is being supplied. In this case only a slight overpressure needs to be generated in the tire. For the simultaneous supply of the compressed air and the extraction of the sealing preparation, a coaxial hose is dipped through the valve bore into the sealing preparation in the tire. The inner hose is connected to the container for the reception of the sealing preparation. The outer hose is connected to the pressure source. The sealing preparation is pressed out of the interior of the tire, via the inner hose, into the container by the compressed air introduced into the tire between the inner and outer hose.

In order to carry out this embodiment, the apparatus contains, in addition to the container provided with a vent opening and the pressure source, a coaxial plug connection and also a coaxial hose. In this plug connection the inner hose opens into the line to the container and the outer hose into the connection to the pressure source. Support ribs can be provided between the inner hose and the wall of the outer hose.

Before the tire valve is removed, the tire should be left to stand for a period of time on its tread with the valve in the six o'clock position and in a slightly inclined position in which the tire side with the valve is somewhat higher than the side of the tire remote from the valve. The free sealing preparation then collects during this time in the bottom of the tire.

With full metal valves, the locking nut is removed and the valve is pushed into the tire. With part metallic valves the valve is cut off above the rim with a knife and the remainder of the valve is pressed into the tire, or the whole valve is removed with a dismantling lever. The hose is then introduced into the valve bore. The hose can be provided at the inserted end with a short metal tube in order to make the end heavier, and thus to guarantee that the hose end dips deeply into the sealing preparation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

In FIG. 1, a part of a cut-away tire is shown. The tire 1 is positioned with a slight inclination on a support 2 so that the sealing preparation 3 collects at the bottom of the tire towards the wall 4 of the tire remote from the valve. The tire valve has already been removed in FIG. 1. The hose 6 is introduced into the tire via the valve bore 5 so that the hose end dips deeply into the sealing preparation 3. The hose 6 is connected at its other end 8 in an air-tight manner to the bottle 9. The bottle 9 consists of soft plastic.

When the bottle 9 is compressed by hand (illustrated by the arrows) and released so that it expands again, the sealing preparation is sucked out of the tire through the hose 6 into the bottle 9 by the depression in the bottle 9. The bottle 9 can be compressed several times in succession. It is held at least 20 cm beneath the support 2. When the sealing preparation 3 has been sucked out of the tire, the tire can be removed from the rim.

Figure 1:
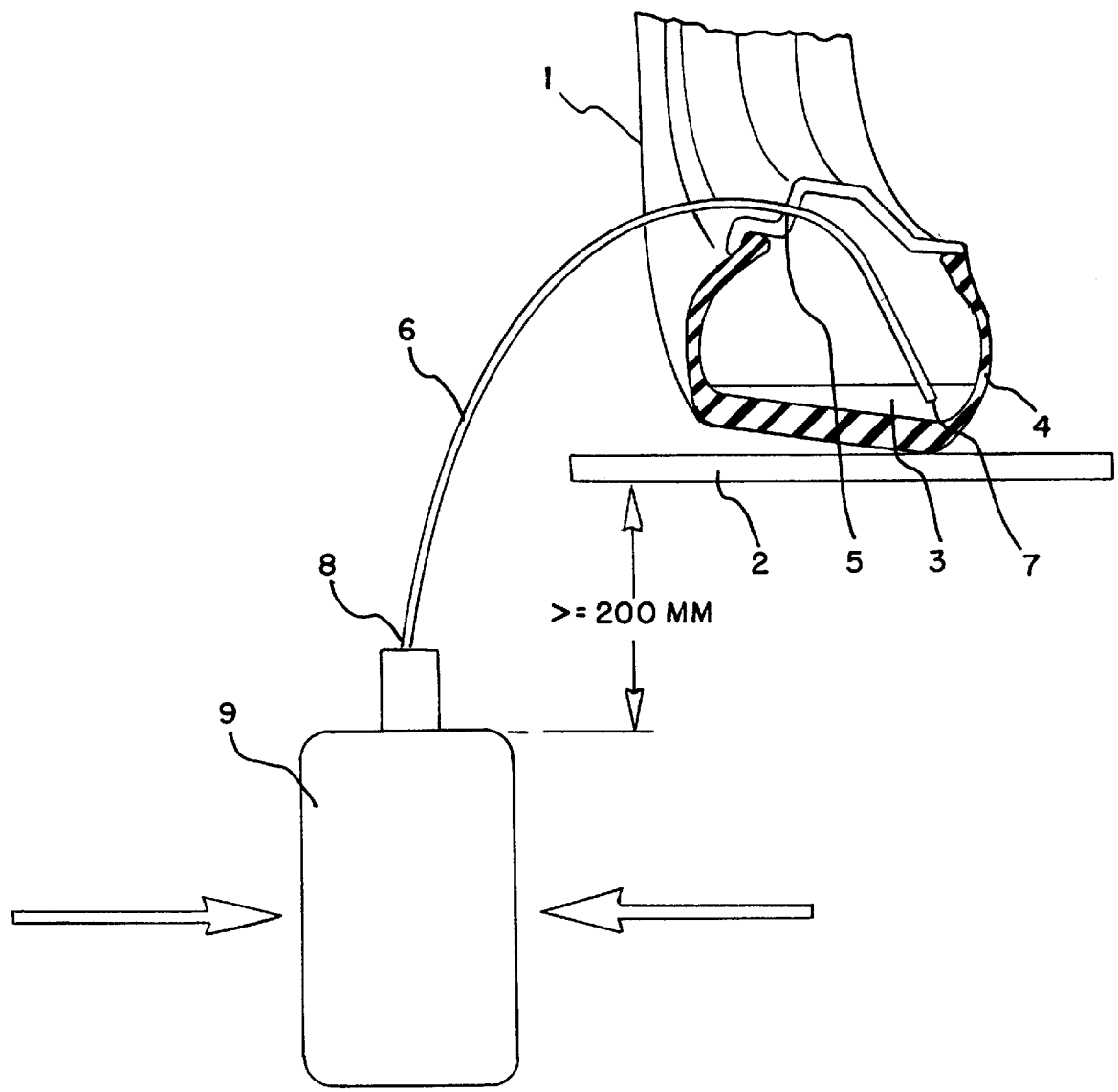
FIG. 1 shows a first embodiment of the invention in a schematic illustration.
Figure 2:
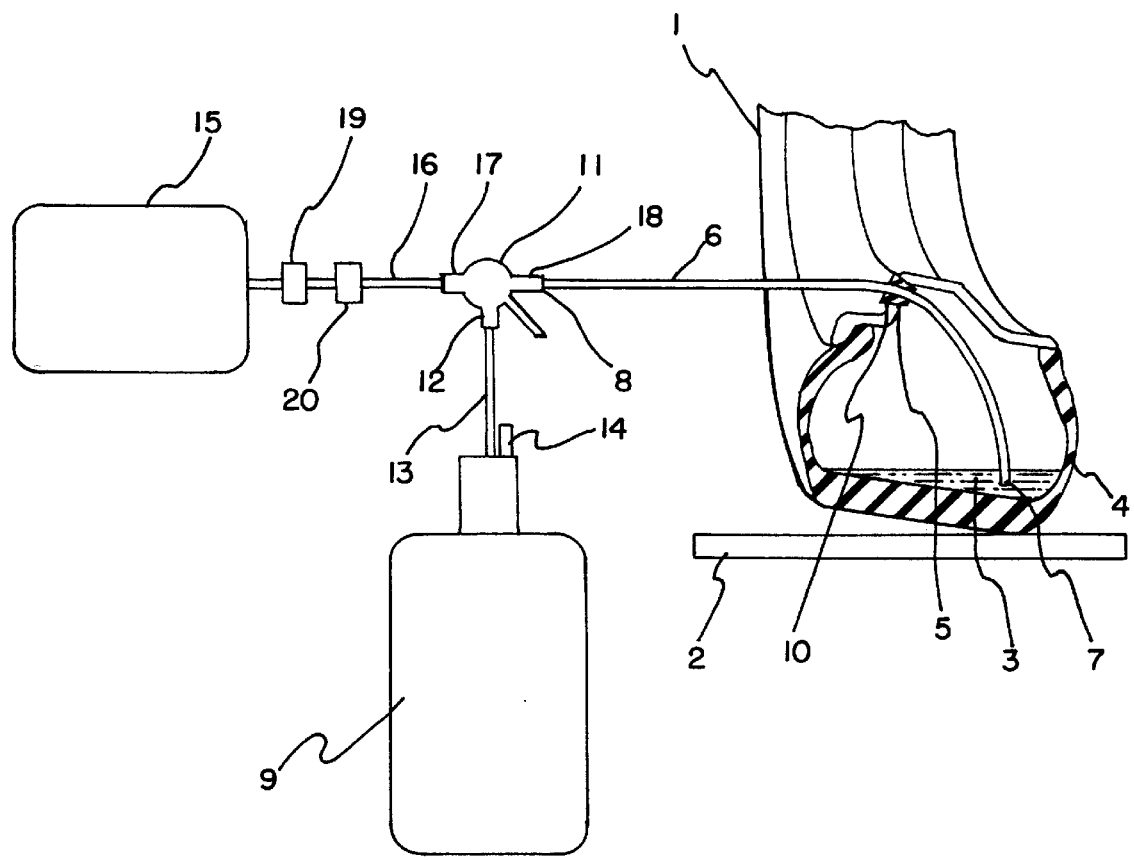
FIG. 2 shows a second embodiment of the invention in a schematic illustration.

In distinction to the manual suction method of FIG. 1, FIG. 2 shows an embodiment in which the sealing preparation is pressed out of the tire by overpressure. In FIG. 2, identical parts are designated with the same reference numerals as in FIG. 1. The intermediate space between the hose 6 and the valve bore 5 is sealed off by a rubber cone 10 pushed onto the hose 6. 11 designates a three-way cock. The bottle 9 is connected to the first input or connection 12 of the three-way cock 11 via the hose 13. The bottle 9 is provided with a vent opening 14. A compressor 15 is connected via a line 16 to the second input or connection 17 of the three-way cock 11. The hose 6 is connected to the third input or connection 18 of the three-way cock 11. The end 7 of hose 6 dips into the sealing preparation 3 in the tire 1.

A non-return valve 19 and a pressure relief valve 20 are arranged in the line 16.

In this embodiment, the three-way cock 11 is first brought into a position in which the connection between the compressor 15 and the hose 6 is established while the first connection 12 of the three-way cock 11 to the hose 13 is closed off. Compressed air is led from the compressor 15 via the hose 6 into the tire 1 until an overpressure of 0.5 to 1 bar is produced in the tire 1. The three-way cock 11 is then slowly brought into a position in which the connection to the compressor 15 is interrupted and a connection is established between the hose 6 and the hose 13. The sealing preparation 3 is pressed through the hose 6 and the hose 13 into the bottle 9 by the overpressure in the tire 1.

In another embodiment, the three-way cock 11 is replaced by a coaxial plug connection 21 and the hose 6 is also replaced by a coaxial hose 22.

Figure 3:
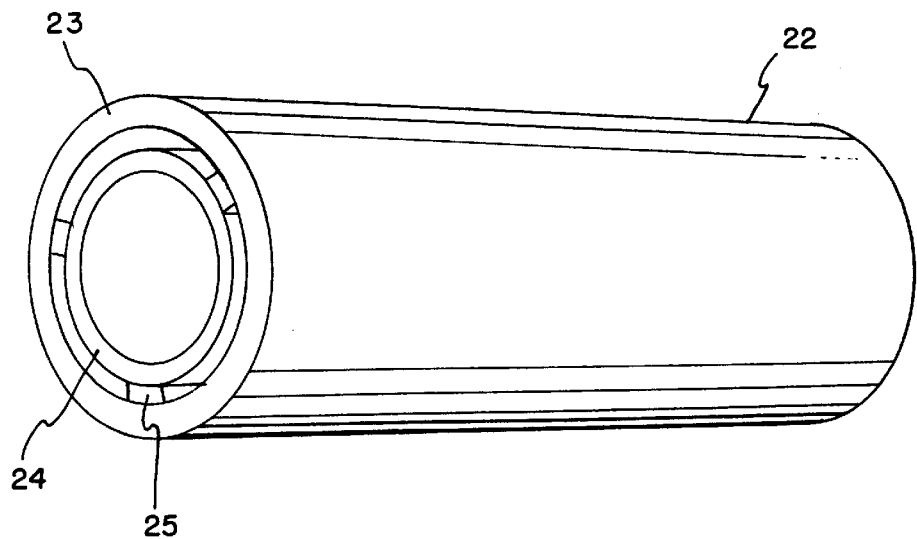
FIG. 3 shows a coaxial hose.

Otherwise, the arrangement shown in FIG. 2 remains unchanged. FIG. 3 shows the coaxial hose 22 which has an outer hose 23, an inner hose 24 and also support ribs 25 between the inner and outer hoses.

Figure 4:
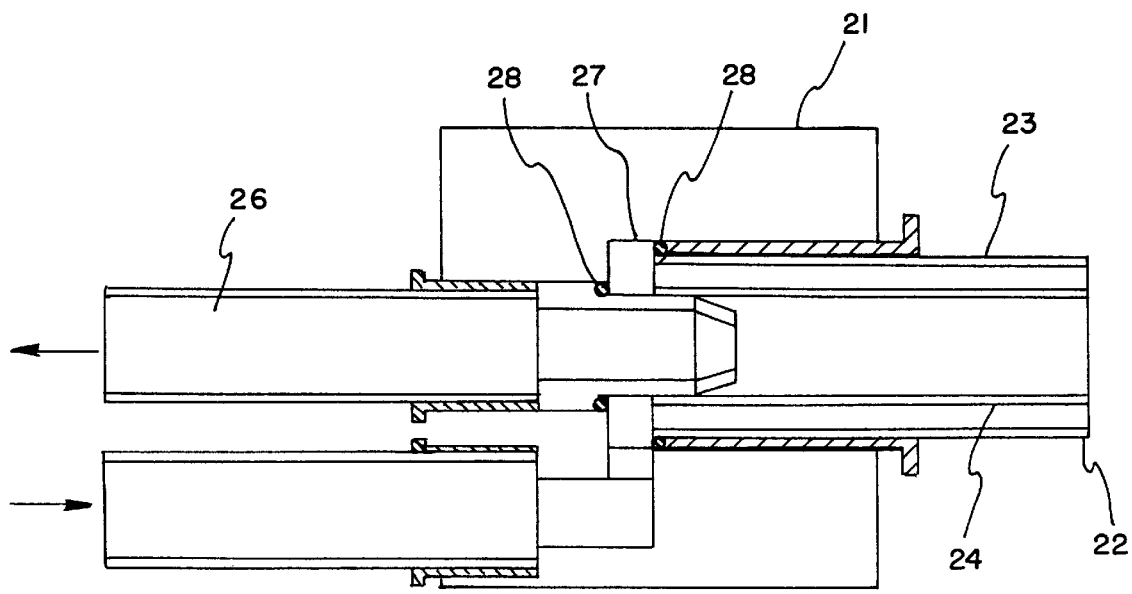
FIG. 4 shows a section through a coaxial plug connection.

In FIG. 4 there is shown a coaxial plug connection 21 in which the coaxial fluid flowing in the inner and outer hoses is transferred into two streams alongside one another.

The inner hose 24 opens into a line 26 at a telescope-like plug connection and the outer hose 23 opens into a ring-shaped passage 27 surrounding the line 26. The hose 13 shown in FIG. 2 is connected to the line 26 while the line 16 is connected to the ring-like passage 27. The plug connection is sealed off by sealing rings 28.

In this embodiment, the supply of compressed air into the tire takes place at the same time as the removal of the sealing preparation 3. The compressed air is guided from the compressor 15 through the line 16, and the outer hose 23 into the tire 1. As soon as a slight overpressure is produced in the tire 1, the sealing preparation 3 is pressed into the bottle 9 upon further supply of compressed air through the inner hose 24 and the hose 13.

In all the described embodiments, a defoaming or anti-foaming agent, for example on a silicon basis, may be introduced into the tire. In the embodiments in which the sealing preparation is sucked off by reduced pressure, the introduction of the defoaming agent takes place after the valve has been removed or prior to the suction process. In the embodiments in which the sealing preparation is pressed out of the tire by an overpressure produced in the tire, the introduction of the anti-foaming agent takes place after the valve removal or prior to the intermediate space between the hose and the valve bore being sealed off.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described our invention what we claim is:

1. A method of removing puncture sealing compositions from a tire, comprising the steps of:

allowing air pressure to flow out of the tire via the tire valve;

removing the tire valve;

introducing a hose into the tire through the valve bore until the introduced hose end dips deeply into the sealing preparation contained in the tire; and generating a pressure differential to remove the sealing compositions through the hose.

2. The method according to claim 1, further comprising the steps of:

generating the pressure differential by means of generating compression in a container connected to the hose end opposite the introduced hose end; and sucking the sealing preparation from the tire into the container.

3. The method in accordance with claim 2, further comprising the step of generating the depression by compression and subsequent expansion of a resilient container.

4. The method in accordance with claim 3, further comprising the step of compressing the container and allowing it to expand several times in succession.

5. The method in accordance with claim 1, further comprising the step of arranging the container to be lower than the sealing preparation in the tire which is to be sucked away.

6. The method in accordance with claim 1, further comprising the steps of:

first allowing the tire to stand on its tread for a period of time with the valve in approximately the six o'clock position; and inclining the tire to one side in order to collect the sealing compositions against one wall of the tire.

7. The method according to claim 1, further comprising the step of introducing a defoaming or anti-foaming agent through the valve bore prior to inserting the hose.

8. An apparatus for carrying out the method in accordance with claim 1, further comprising a compressible container to which a hose is connected in an air-tight manner.

9. The method in accordance with claim 1, further comprising the steps of:

sealing off the intermediate space between the hose and the valve bore generating the pressure differential by excess pressure in the tire; and pressing out the sealing preparation from the tire via the hose into a container which is connected to the hose by means of the excess pressure in the tire.

10. An apparatus for carrying out the method in accordance with claim 9, further comprising:

a container provided with a vent opening;

a line connected to the container and leading to one opening of a three-way cock;

a pressure source with a connection to the second opening of the three-way cock; and a hose connected to the third opening of the three-way cock.

11. The apparatus in accordance with claim 10, further comprising a pressure relief valve and a check-valve arranged in the connection between the pressure source and the second opening of the three-way cock.

12. The method in accordance with claim 9, further comprising the steps of:

connecting the hose to a pressure source;

interrupting the connection to the pressure source after generating the excess pressure; and connecting the hose to the container.

13. The method in accordance with claim 9, further comprising the step of generating an excess pressure of 0.5 to 1 bar in the tire.

14. The method in accordance with claim 1, further comprising the step of sealing off the intermediate space between the hose and the valve bore by a rubber cone pushed onto the hose.

15. The method in accordance with claim 9, further comprising the steps of:

introducing a coaxial hose through the valve bore into the tire;

connecting an annular space between outer and inner hoses of the coaxial hose source; and connecting the inner hose to the container.

16. The apparatus for carrying out the method of claim 15, further comprising:

a container provided with a vent opening;

a line connected to the container and leading to a coaxial plug connection;

a pressure source with a connection to the coaxial plug connection and a coaxial hose;

an inner hose of the coaxial hose is connected in the coaxial plug connection to the line; and an outer hose of the coaxial hose is connected in the coaxial plug connector to the connection.

* * * * *